US011165209B2

(12) United States Patent
Lin et al.

(10) Patent No.: US 11,165,209 B2
(45) Date of Patent: Nov. 2, 2021

(54) ASSEMBLING STRUCTURE FOR A CONDUCTIVE PLATE OF A HANDHELD POWER TOOL

(71) Applicant: Yu-Tang Lin, New Taipei (TW)

(72) Inventors: Yu-Tang Lin, New Taipei (TW); Hsien-Yu Kao, New Taipei (TW)

(73) Assignee: Yu-Tang Lin, New Taipei (TW)

( * ) Notice: Subject to any disclaimer, the term of this patent is extended or adjusted under 35 U.S.C. 154(b) by 346 days.

(21) Appl. No.: 16/405,571

(22) Filed: May 7, 2019

(65) Prior Publication Data

US 2020/0235537 A1    Jul. 23, 2020

(30) Foreign Application Priority Data

Jan. 22, 2019    (TW) .................................. 108201032

(51) Int. Cl.
| | |
|---|---|
| H01M 10/42 | (2006.01) |
| H01R 31/06 | (2006.01) |
| B25F 5/02 | (2006.01) |
| H01M 50/50 | (2021.01) |
| B25B 21/00 | (2006.01) |

(52) U.S. Cl.
CPC ............... *H01R 31/06* (2013.01); *B25F 5/02* (2013.01); *H01M 10/42* (2013.01); *H01M 10/425* (2013.01); *H01M 50/50* (2021.01); *B25B 21/00* (2013.01); *H01M 2010/4271* (2013.01); *H01M 2220/30* (2013.01)

(58) Field of Classification Search
CPC .... H01R 31/06; H01M 50/50; H01M 10/425; H01M 2220/30; H01M 2010/4271; B25F 5/02; B25B 21/00
See application file for complete search history.

(56) References Cited

U.S. PATENT DOCUMENTS

| | | | |
|---|---|---|---|
| 2005/0218867 A1* | 10/2005 | Phillips ..................... | B25F 5/02 320/114 |
| 2009/0208819 A1* | 8/2009 | Cruise ................... | H01M 10/44 429/50 |
| 2013/0136956 A1* | 5/2013 | Nakano ............... | H01M 50/213 429/7 |
| 2015/0249237 A1* | 9/2015 | Naito .................... | H01M 50/20 429/7 |

* cited by examiner

Primary Examiner — Alexander Usyatinsky
(74) *Attorney, Agent, or Firm* — Rabin & Berdo, P.C.

(57) ABSTRACT

An assembling structure for a conductive plate of a handheld power tool has a battery having a casing, a circuit board, an adapter, and multiple conductive plates. The circuit board, the adapter and the conductive plates are all located in the casing. The adapter is mounted on a top surface of the circuit board, and has multiple adapting grooves. The conductive plates are mounted in the adapting grooves of the adapter respectively, and are electrically connected to the circuit board. By mounting the adapter on the top surface of the circuit board and mounting the conductive plates in the adapting grooves of the adapter respectively, the conductive plates and the circuit board are able to be combined and fixed together by the adapter without the welding progress, which reduces the consumable cost, the labor cost, and the time consumption.

2 Claims, 7 Drawing Sheets

ASSEMBLING STRUCTURE FOR A CONDUCTIVE PLATE OF A HANDHELD POWER TOOL

CROSS-REFERENCE TO RELATED APPLICATIONS

This application is based upon and claims priority under 35 U.S.C. 119 from Taiwan Patent Application No. 108201032 filed on Jan. 22, 2019, which is hereby specifically incorporated herein by this reference thereto.

BACKGROUND OF THE INVENTION

1. Field of the Invention

The present invention relates to a tool, especially to a handheld power tool.

2. Description of the Prior Arts

A handheld power tool makes assembling or disassembling of objects easier and more effective. The handheld power tool uses a battery as a power source and is combined with a traditional hand tool such as a screwdriver or a drill so that people can use a handheld power tool instead of manually driving the hand tools.

The abovementioned handheld power tool has a driving assembly, a handheld seat, and a battery. The battery is detachably mounted on a bottom end of the handheld seat as a power source to drive the driving assembly which is mounted on a top end of the handheld seat. Thus, by mounting a hand tool such as a screwdriver or a drill on the driving assembly, a user is able to drive the tool by electricity instead of driving the tool manually.

After a conventional handheld seat is combined with a conventional battery (which means after the battery is combined with protruding ribs formed on a bottom end of the handheld seat), a conductive structure formed on the bottom end of the handheld seat will be mounted into a conducting hole formed on a top end of the battery and abuts and electrically connects a conductive plate mounted in the conducting hole, and then forms a circuit. The conventional conductive plate is welded directly to a circuit board inside the battery and corresponds in position to the conducting hole in order to be electrically connected.

However, this structural configuration has the following disadvantages.

First, the manufacturer has to do an extra welding process after assembling so that the cost will increase. In other words, the extra welding process leads to extra cost in consumables, and the welding process, no matter done manually by labor or automatically on an assembly line, takes extra time.

Second, the conductive plate might be broken after times of assembling and disassembling or be damaged because of a poor connection with the handheld seat. Therefore, the conductive plate, welded to the circuit board by the conventional fixing method, is quite troublesome during repair and replacement.

To overcome the shortcomings, the present invention provides an assembling structure for a conductive plate of a handheld power tool to mitigate or obviate the aforementioned problems.

SUMMARY OF THE INVENTION

The main objective of the present invention is to provide an assembling structure for a conductive plate of a handheld power tool that can fix the conductive plate without welding the conductive plate, and further reduce the cost in manufacturing and maintenance.

The assembling structure for a conductive plate of a handheld power tool has a battery. The battery has a casing, a circuit board, an adapter, and multiple conductive plates. The casing has an inner space. The circuit board is located in the inner space of the casing. The adapter is located in the inner space of the casing. The adapter is mounted on a top surface of the circuit board and has multiple adapting grooves. The conductive plates are located in the inner space of the casing. The conductive plates are mounted in the adapting grooves of the adapter respectively and are electrically connected to the circuit board.

By mounting the adapter on the top surface of the circuit board and mounting the conductive plates in the adapting grooves of the adapter respectively, the conductive plate and the circuit board are able to be combined and fixed together by the adapter without the welding process. Thus, the manufacturer only has to mount the conductive plate in the adapting groove so that the consumable cost, the labor cost, and the time consumption during manufacturing will be significantly reduced. Moreover, the present invention is easy to repair as well because a damaged conductive plate can be removed and replaced easily from the adapting groove. Therefore, the present invention is commercially competitive.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
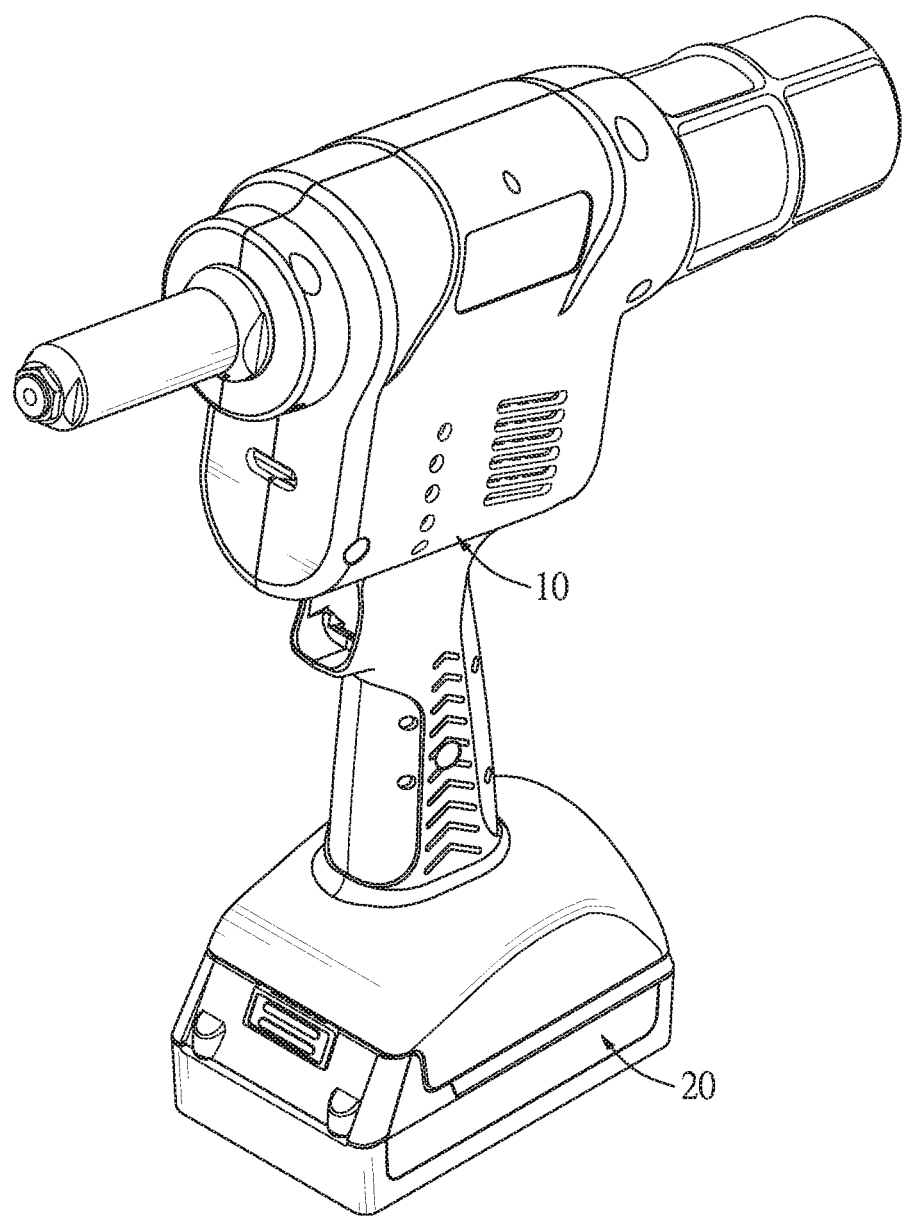
FIG. 1 is a perspective view of an assembling structure for a conductive plate of a handheld power tool in accordance with the present invention.
Figure 2:
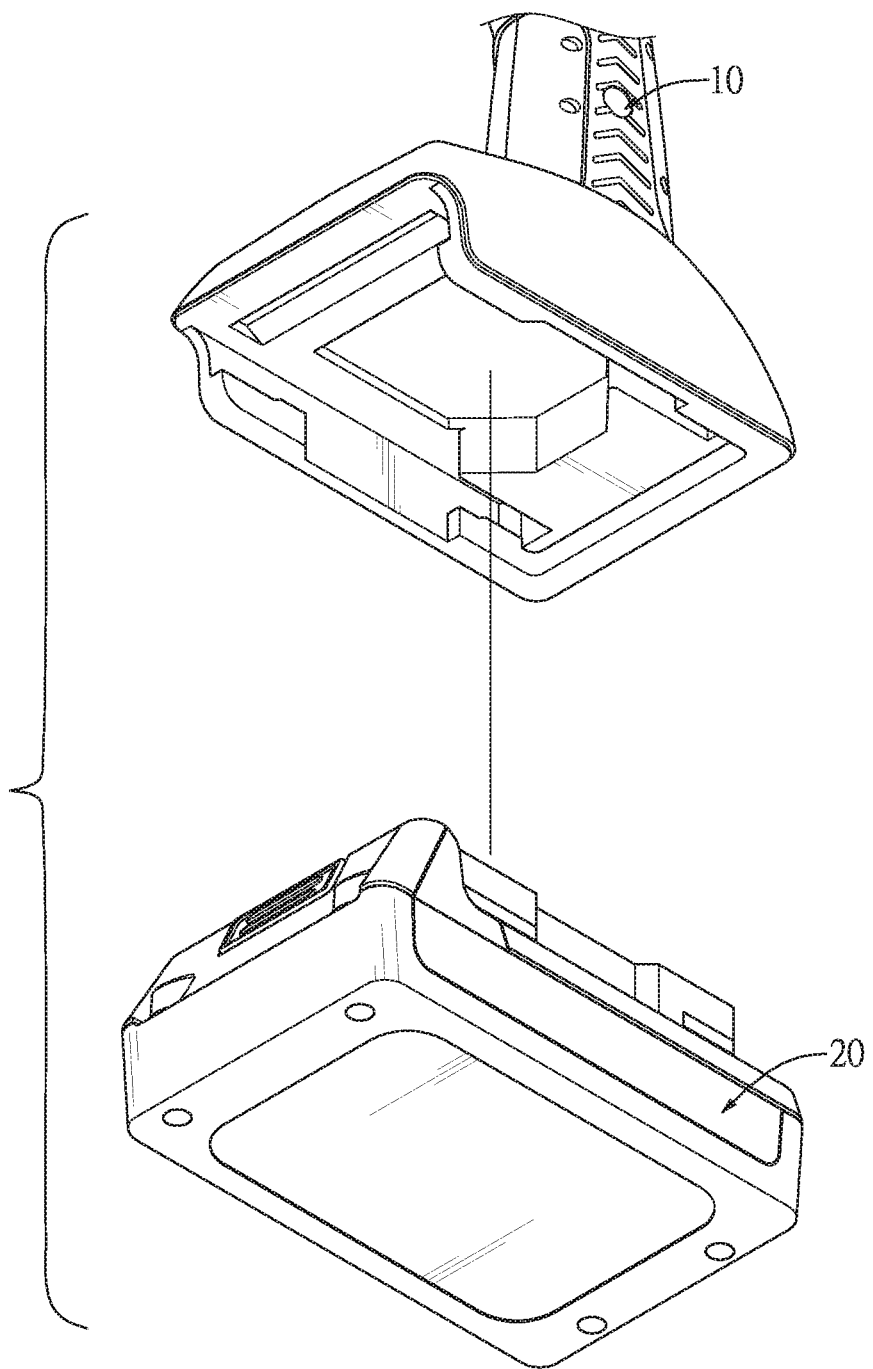
FIG. 2 is an exploded view of the assembling structure for a conductive plate of a handheld power tool in FIG. 1.

With reference to FIGS. 1 and 2, an assembling structure for a conductive plate of a handheld power tool in accordance with the present invention comprises a handheld seat 10 and a battery 20.

Figure 3:
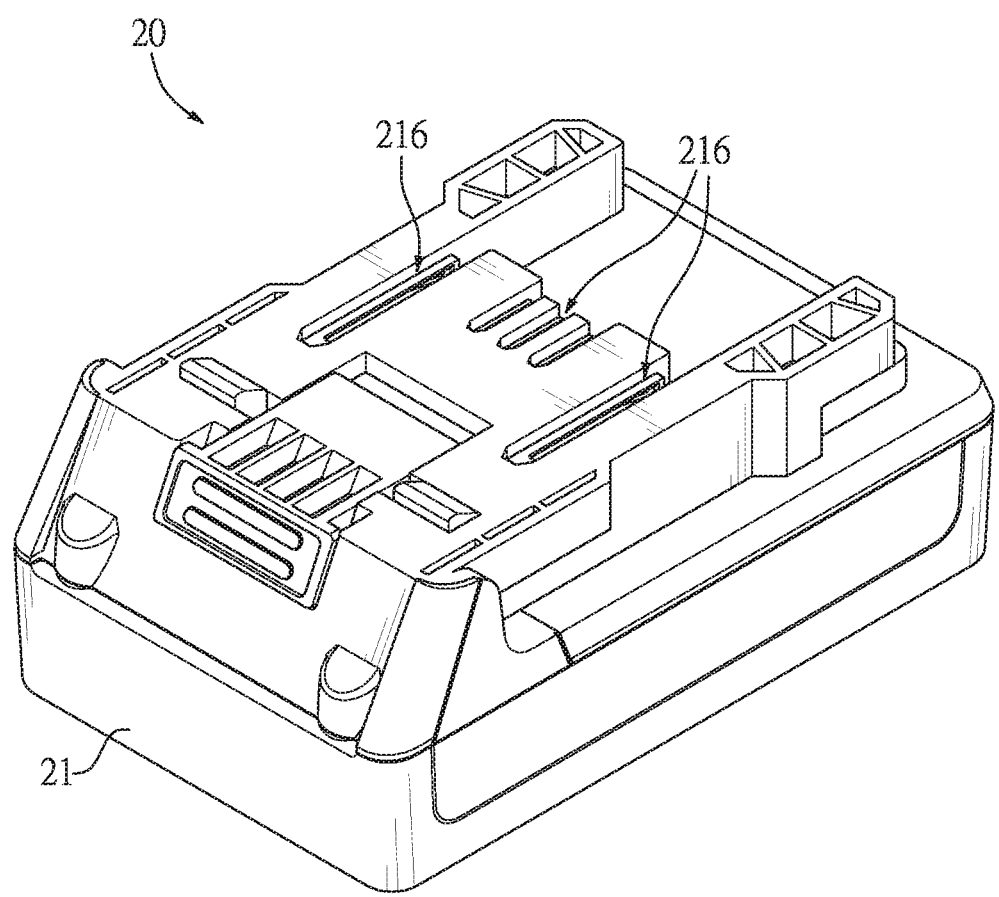
FIG. 3 is a perspective view of the assembling structure for a conductive plate of a handheld power tool in FIG. 1; showing the battery.
Figure 4:
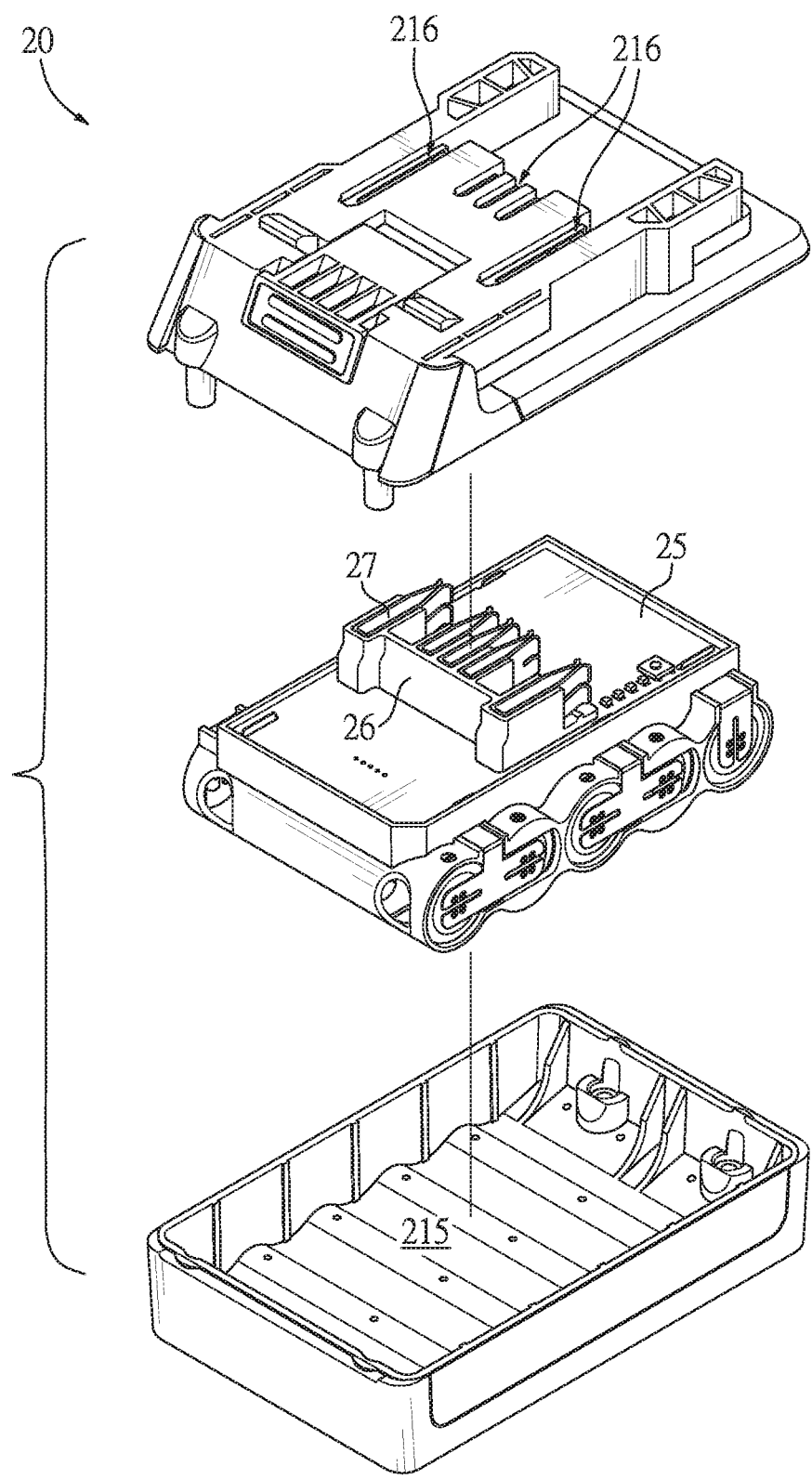
FIG. 4 is an exploded view of the assembling structure for a conductive plate of a handheld power tool in FIG. 1; showing the battery.

With further reference to FIGS. 3 and 4, the battery 20 is mounted on a bottom end of the handheld seat 10 and has a casing 21, a circuit board 25, an adapter 26, and multiple conductive plates 27.

Figure 5:
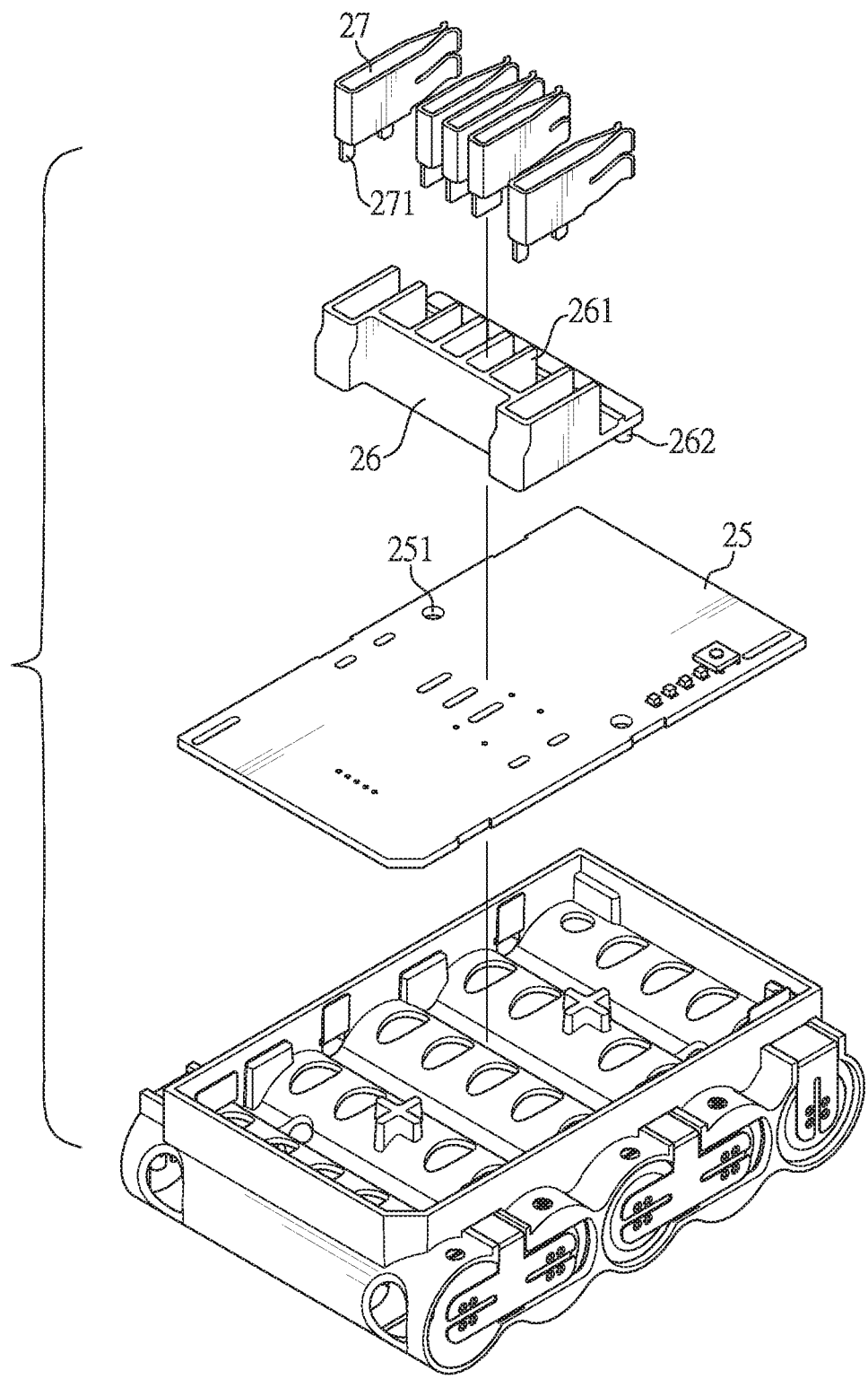
FIG. 5 is an exploded view of the assembling structure for a conductive plate of a handheld power tool in FIG. 1; showing the conductive plate, the adapter, and the circuit board.
Figure 6:
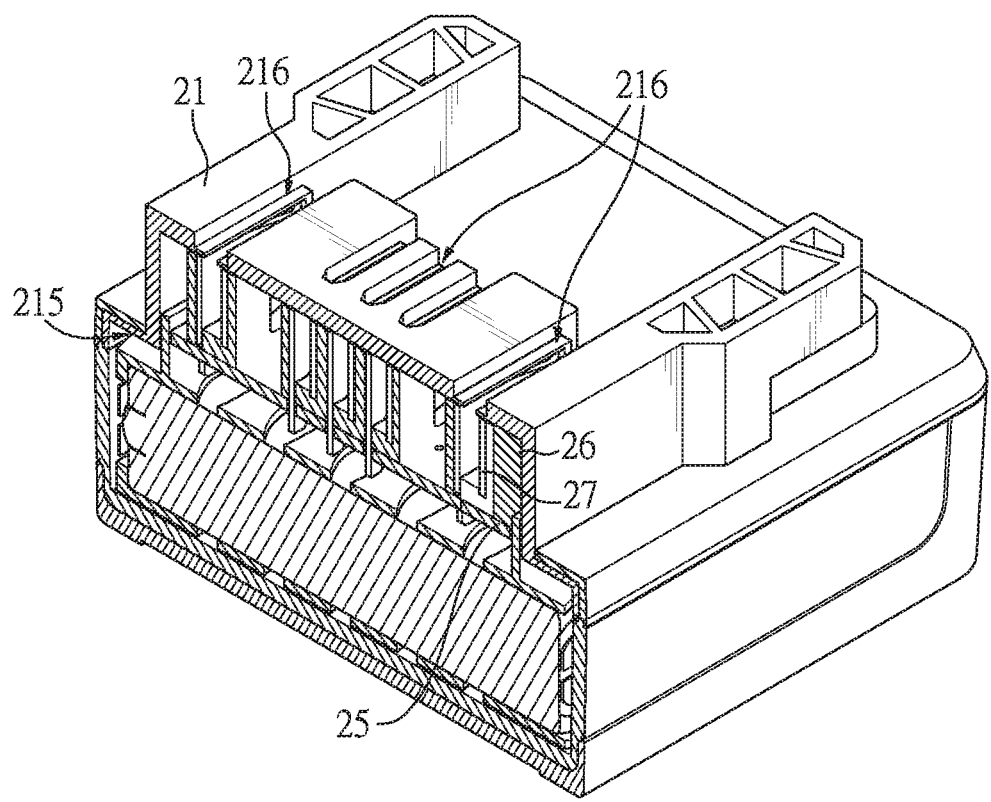
FIG. 6 is a side view in section of the assembling structure for a conductive plate of a handheld power tool in FIG. 1; showing the battery.

With further reference to FIGS. 4, 5 and 6, the casing 21 has an inner space 215 and multiple conducting holes 216. The circuit board 25 is located in the inner space 215 of the casing 21.

The adapter 26 is located in the inner space 215 of the casing 21, is mounted on a top surface of the circuit board 25, and has multiple adapting grooves 261. Specifically, in this embodiment, the adapter 26 is detachably mounted on the top surface of the circuit board 25. More specifically, the adapter 26 has multiple combining pillars 262 formed on a bottom surface of the adapter 26 and the circuit board 25 has multiple combining holes 251. The combining pillars 262 are mounted through the combining holes 251. Therefore, the adapter 26 is able to be engaged with the circuit board 25 without any extra fixing or attaching progress such as welding. The adapter 26 is not limited to be combined with the circuit board 25 by the abovementioned way, as the adapter 26 can be implemented without the combining pillars 262 and the circuit board 25 can be implemented without the combining holes 251. In this case, the adapter 26 and the circuit board 25 can also be combined together by any other method. Besides, the adapter 26 can be fixed undetachably on the circuit board 25 as well.

Figure 7:
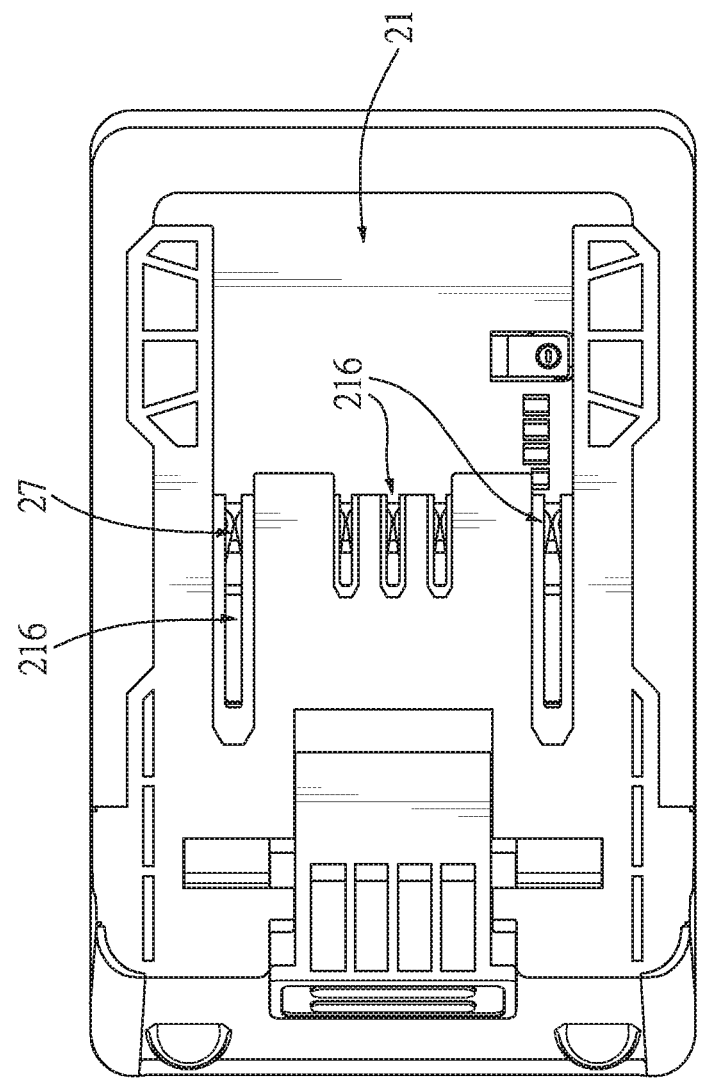
FIG. 7 is a top view of the assembling structure for a conductive plate of a handheld power tool in FIG. 1; showing the battery.

With further reference to FIGS. 5, 6 and 7, the conductive plates 27 are located in the inner space 215 of the casing 21, are mounted in the adapting grooves 261 respectively, and are electrically connected to the circuit board 25. Besides, the conductive plates 27 correspond in position to the conducting holes 216 in order to be electrically connected (which means that other objects are able to pass through the conducting holes 216 from outside the casing 21 and abut the conductive plates 27). In addition, the casing 21 can be implemented with only one conducting hole 216. In this case, all the conductive plates 27 correspond in position to the conducting hole 216, and all the conductive plates 27 are electrically connected through the conducting hole 216.

Specifically, in this embodiment, each one of the conductive plates 27 has a connecting segment 271 mounted through the bottom surface of the adapter 26. The connecting segment 271 abuts and is electrically connected to the circuit board 25. The way how the connecting segment 271 and the circuit board 25 are electrically connected is not limited to the abovementioned. For example, in another embodiment, the adapter 26 is electrically connected to the circuit board 25, and therefore the conductive plates 27 can be electrically connected to the circuit board 25 indirectly through the adapter 26. In addition, in this embodiment, the conductive plates 27 are respectively mounted in the adapting grooves 261 detachably for ease of repair and replacement. But, in another embodiment, the conductive plates 27 and the adapting grooves 261 can be implemented undetachably.

By mounting the adapter 26 on the top surface of the circuit board 25 and mounting the conductive plates 27 in the adapting grooves 261 of the adapter 26 respectively, the conductive plates 27 and the circuit board 25 are able to be combined and fixed together by the adapter 26 without the welding process. Thus, the manufacturer only has to mount the conductive plates 27 in the adapting grooves 261 during manufacturing so that the consumable cost, the labor cost, and the time consumption will be significantly reduced. Moreover, the present invention is easy to repair as well because a damaged conductive plate 27 can be taken out easily from the adapting groove 261 for replacement. Therefore, the present invention is commercially competitive.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An assembling structure for a conductive plate of a handheld power tool, the assembling structure comprising:
    a battery having
        a casing having
            a base;
            a cover mounted on the base;
            an inner space formed between the base and the cover; and
            at least one conducting hole formed on the cover;
        a circuit board located in the inner space of the casing;
        an adapter located in the inner space of the casing; the adapter mounted on a top surface of the circuit board and having multiple adapting grooves; and
        multiple conductive plates located in the inner space of the casing, disposed below the cover, and corresponding in position to the at least one conducting hole of the cover, the conductive plates being downwardly mounted in the adapting grooves of the adapter respectively and electrically connected to the circuit board, the adapter being mounted between the conductive plates and the circuit board, wherein
        multiple combining holes are formed on the top surface of the circuit board,
        multiple combining pillars are formed on a bottom surface of the adapter and are mounted through the combining holes respectively, and
        each one of the conductive plates of the battery has a connecting segment formed through the bottom surface of the adapter, the connecting segment abutting, and being electrically connected to, the circuit board.

2. The assembling structure as claimed in claim 1, wherein
    the adapter of the battery is detachably mounted to the top surface of the circuit board; and
    the conductive plates are detachably mounted in the adapting grooves, respectively.

* * * * *